United States Patent [19]

Krause

[11] 3,866,130
[45] Feb. 11, 1975

[54] SIGNAL COMPARATOR WITH PROGRAMMED THRESHOLD

[75] Inventor: Melvin G. Krause, Cedar Rapids, Iowa

[73] Assignee: Rockwell International Corporation, Dallas, Tex.

[22] Filed: Mar. 7, 1974

[21] Appl. No.: 449,166

[52] U.S. Cl............... 328/147, 307/235 R, 328/149
[51] Int. Cl........................... H03b 3/02, H03k 5/20
[58] Field of Search.............................. 307/235 R; 328/146–149

[56] References Cited
UNITED STATES PATENTS

| | | | |
|---|---|---|---|
| 3,492,589 | 1/1970 | Rotier | 307/235 R |
| 3,710,149 | 1/1973 | Thomson | 307/235 R |
| 3,736,434 | 5/1973 | Darrow | 307/235 R |

Primary Examiner—John Zazworsky
Attorney, Agent, or Firm—Richard W. Anderson; Robert J. Crawford

[57] ABSTRACT

A signal comparator with trip threshold sensitivity programmed to decrease in proportion to increasing levels of signals to be compared so as to obviate nuisance tripping when monitoring the trackability of signals whose source error increases with signal level.

7 Claims, 7 Drawing Figures

SIGNAL COMPARATOR WITH PROGRAMMED THRESHOLD

The Invention herein described was made in the course of or under a contract or subcontract thereunder with the Department of The Air Force.

This invention relates generally to analog signal comparators of the type employed to monitor the trackability of one signal versus the other, and more particularly to an improved comparator with trip threshold programmed as a function of the level of the input signals being compared.

Signal comparators are widely employed in redundant control systems wherein input signals or computed command signals are developed on a redundant basis and comparator means is employed to monitor certain signal pairs for acceptable trackability.

In certain applications the inherent error of the sources developing the signals to be compared, or the error in computations which develop output signals to be compared, increases as a direct function of the signal amplitude. Known comparators, operating on a fixed threshold or trip level, may then give rise to intolerable nuisance comparator trips and nuisance disconnects in a redundant control system.

Comparators with a preadjustable threshold may at best be set for a compromise threshold value over the range of levels over which signals are expected to be compared.

Accordingly, the object of the present invention is the provision of a signal comparator providing an output logic level or other means of annunciation when the amplitude discrepancy between a pair of signals being compared exceeds a programmed threshold which is increased as a direct function of the amplitude of at least one of the input signals being compared.

A further object of the present invention is the provision of a signal comparator the threshold of which increases with input signal amplitude and in which a large percentage of all comparator circuitry failures will result in either comparator failure indication or a more sensitive comparator threshold.

The present invention is featured in the provision of means for applying an input signal pair to respective inverting and noninverting input terminals of an operational amplifier and for additionally applying a symmetrical AC square wave bias signal to one of the operational amplifier input terminals. Means are employed for adjusting the amplitude of the AC square wave bias signal as a direct function of at least one of the input signals being compared, whereby the output from the operational amplifier is either a DC signal or an AC square wave depending upon whether the amplitude difference between the analog input signals applied thereto is less than or in excess of the peak amplitude of the square wave for the bias signal.

The present invention is further featured in the provision of a signal comparator wherein the trip threshold is a predetermined finite level for zero level input signals and increases linearly as a direct function of the amplitude of at least one of the input signals.

These and other features and objects of the present invention will become apparent upon reading the following description with reference to the accompanying drawings in which.

Figure 1:
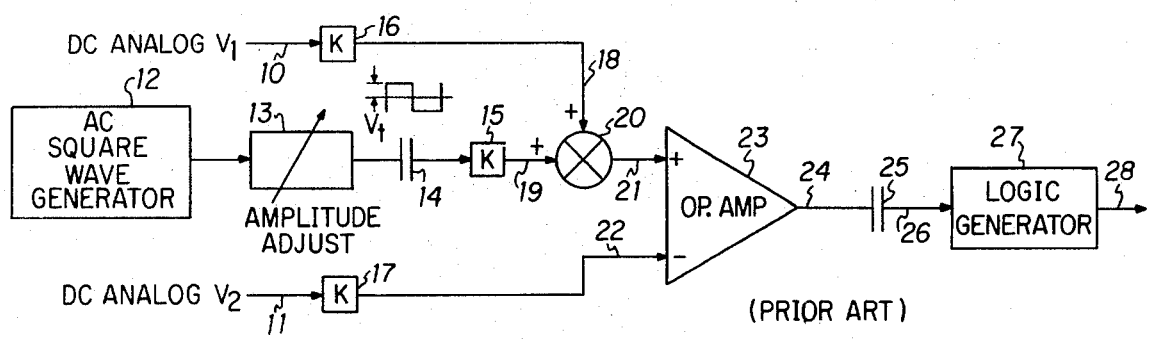
FIG. 1 is a functional representation of a signal comparator means known in the art, including means for establishing a selected trip level.

FIG. 1 illustrates a state of the art signal comparator wherein DC analog input signals $V_1$ and $V_2$ are monitored and a logic output signal is developed which is definitive of whether the difference in amplitude between the analog input signals 10 and 11 is less than, or in excess of, a selectable threshold value. In general operation, the comparator of FIG. 1 applies analog input signal 10 and 11 through associated gain factor elements 16 and 17 as respective inputs to the noninverting and inverting input terminals of an operational amplifier 23. An AC square wave generator 12 supplies a bias signal, the amplitude of which may be adjusted by means 13. The amplitude adjusted AC square wave is coupled through capacitor 14 and desired gain factor means 15 for algebraic summation in combining means 20 with one of the DC analog input signals. As illustrated, the AC bias reference square wave is combined with the DC analog input signal $V_1$. Thus input 21 to the noninverting input of the amplifier 23 is comprised of the algebraic summation of the symmetrical AC square wave of preselected amplitude and DC analog input signal 10. Input 22 to the inverting input terminal of operational amplifier 23 comprises a predetermined direct function of DC analog input signal $V_2$. Operational amplifier 23 is utilized in an open loop fashion and is readily saturable. Differential current summation of the input signals then effects a saturated DC output 24 of one polarity or the other from operational amplifier 23 should the difference between analog input signals 10 and 11 exceed the peak value, designated $V_T$, of the symmetrical AC square wave bias signal. Should the difference between analog input signals 10 and 11 be less than the peak amplitude of the square wave bias signal, the output 24 from operational amplifier 23 comprises an AC square wave. The output 24 from the operational amplifier 23 is coupled through capacitor 25 to to provide an input 26 to a logic generating means 27 the output 28 of which may comprise a DC logic level indicative of whether the trip level of the comparator, as established by the amplitude of the square wave bias signal, has or has not been exceeded by the difference between analog inputs $V_1$ and $V_2$. Adjustment means 13 thus establishes a threshold at which output 28 goes from one logic level to another.

The comparator of FIG. 1 operates on a differential basis as concerns the input signals thereto. Since the analog input signals to be compared are applied to the respective inverting and noninverting input terminals of the operational amplifier, the equal analog inputs $V_1$ and $V_2$ produce a zero output, and the bias square wave causes the operational amplifier 23 to toggle and produce an AC square wave output 24.

Due to the differential combination of inputs, when the difference between $V_1$ and $V_2$ is less than the amplitude of the square wave, the output is still an AC square wave. However, when the difference between the inputs $V_1$ and $V_2$ is greater than the amplitude of the square wave, the operational amplifier saturates in one polarity or the other. Since the output 24 of the amplifier 23 is capacitively coupled to the ensuing logic generating means, the input 26 to the logic generating means is conveniently zero when the comparator threshold has been exceeded and is a symmetrical AC square wave when the threshold has not been exceeded. As will be further described, logic generating means 27 may comprise any number of implementations responsive to an AC input signal to generate a discrete logic level for annunciation purposes.

As above mentioned, the source of signals to be compared may exhibit an increase of source error with increase in analog signal amplitude. In these instances it is desirable if not imperative that the comparator circuitry to which such signals are applied for monitoring exhibit decreased sensitivity with increasing input signal amplitude in order to prevent nuisance tripping. In accordance with the present invention and, as depicted generally in FIG. 2, the desired decrease in comparator sensitivity may be realized by means responsive to the level of one or the other of the DC analog input signals to control the amplitude of the AC square wave bias signal which is differentially combined with the analog input signal by the operational amplifier 23.

Figure 2:
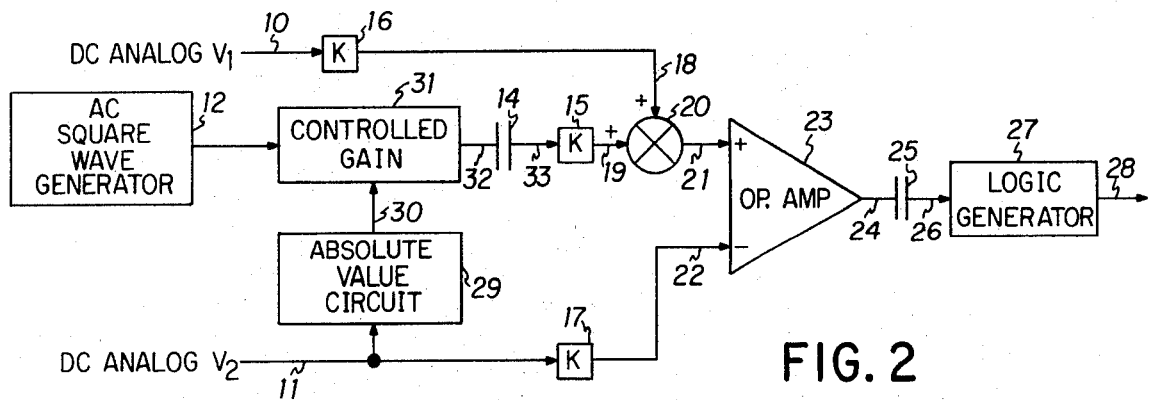
FIG. 2 is a general functional operational diagram of an improved signal comparator in accordance with the present invention.

Thus FIG. 2 illustrates an AC square wave generator 12 providing a square wave signal to a controlled gain means 31. The gain 31 may in turn be controlled in proportion with the level of the DC analog input signal $V_2$ by applying input signal 11 to an absolute value circuit 29 the output 30 of which is applied to control gain means 31. The output 32 from controlled gain means 31 is an AC square wave with amplitude a function of the level of analog input signal 11. The absolute value circuitry 29 is employed since either or both of the analog input signals to be compared may be of one polarity or the other. The output 32 from gain means 31 is applied through capacitor 14 for algebraic summation with analog input signal $V_1$ as applied to the operational amplifier 23. Since the amplitude of the symmetrical AC square wave 33 establishes the threshold or trip level of the comparator, the circuitry of FIG. 2 provides a trip level which increases in proportion to the amplitude of DC analog input signal $V_2$ and thus provides the desired decrease in comparator sensitivity with increased input signal level.

Figure 3:
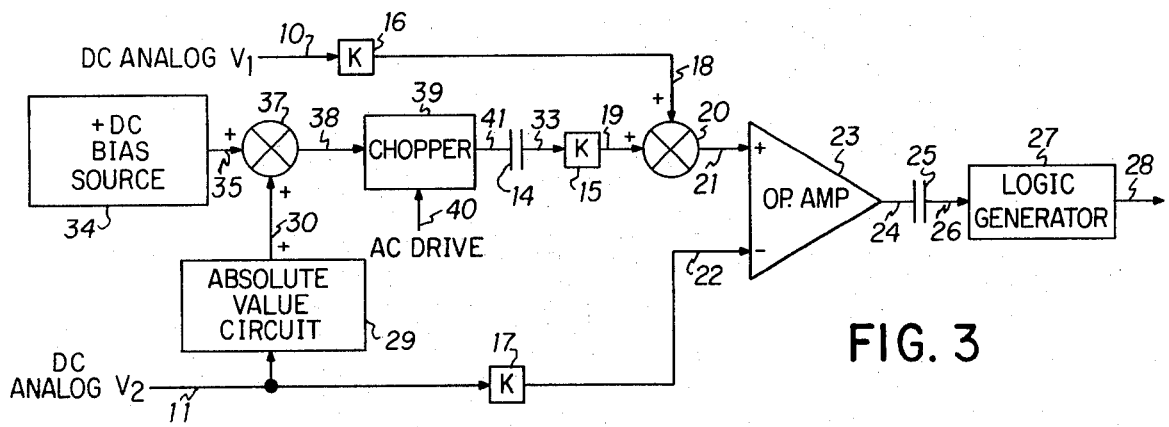
FIG. 3 is a functional representation of a further embodiment of an improved signal comparator in accordance with the present invention.

A further embodiment of a programmed threshold signal comparator in accordance with the present invention is depicted functionally in FIG. 3. In FIG. 3 the AC square wave bias signal is generated such that its peak amplitude is a direct function of the level of one of the analog input signals, exampled in FIG. 3 as DC analog input signal $V_2$. The AC reference bias signal is generated by adding to a reference DC bias source 34 the output of an absolute value circuitry 29 having a polarity like that of the reference bias source. As illustrated, a positive DC bias source 34 is employed, and the absolute value circuit 29 produces an output 30 of positive polarity in response to analog input signals 11 of either polarity. Signal combining means 37 receives the positive DC bias signal 35 and the output 30 of the absolute value circuit 29 to produce a DC signal 38 the amplitude of which is that of the DC bias source proportionally increased by the absolute value of DC analog input 11. This reference signal 38 is applied to a chopper 39 driven by an AC drive source 40. The chopper output 41 is applied through a coupling capacitor 14 which strips off the DC level and produces a symmetrical square wave 33 the amplitude of which is proportional to the magnitude of the DC bias source 34 as increased proportionally by the absolute value of DC analog input signal $V_2$. The ensuing circuitry in FIG. 3 is identical with that of FIG. 2. Although not particularly illustrated, in order that the reference square wave have an amplitude which is directly proportional to the bias source and analog input signal $V_2$ level, it is necessary that the bias source and the output of the absolute value circuitry 29 be of like polarity. For purposes of the present invention, a negative DC bias source 34 may be employed along with an absolute value circuitry 29 which produces an output 30 of negative polarity.

Each of the embodiments of FIG. 2 and FIG. 3 develops an output 24 from operational amplifier 23 in the form of an AC square wave when the difference between $V_1$ and $V_2$ is less than the amplitude of the square wave bias signal applied to the operational amplifier, and develops a DC output signal 24 (a saturated signal of one polarity or the other) when the difference between the analog input signals $V_1$ and $V_2$ is in excess of the amplitude of the AC square wave bias signal. Coupling capacitor 25 on the output of the operational amplifier passes the AC signal to the exclusion of the DC signal output, and thus logic generation means 27 may comprise a variety of implementations which, in response to an AC signal will develop a discrete output logic level, whereas, in response to zero input thereto will establish a complementary logic output.

Figure 4:
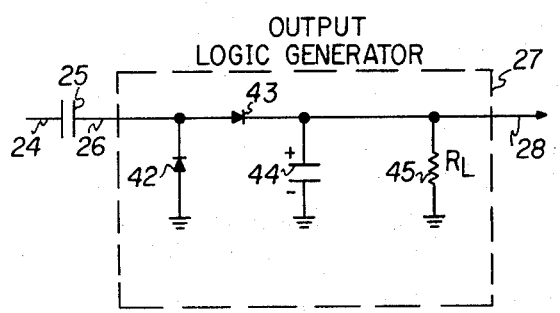
FIG. 4 is a schematic representation of a type of logic generation circuitry employable in the systems of FIGS. 1-3.

FIG. 4 illustrates a type of logic generation circuitry which may be responsive to an AC input signal to develop a discrete output logic level. Diodes 42 and 43, capacitor 44, and load resistor 45, form a voltage double circuitry. In response to an AC output 24 from operational amplifier 23 which is coupled through capacitor 25 as an input 26 to the voltage doubler, a positive charge is developed on capacitor 44. When the amplitudes of $V_1$ and $V_2$, and therefore the amplitudes of inputs 21 and 22 to amplifier 23, differ by an amount that exceeds the peak value of the square wave bias signal, operational amplifier 23 saturates in one polarity or the other. Coupling capacitor 25 blocks this DC voltage and the charge on capacitor 44 is allowed to bleed off, showing that an invalid state has occurred. The values of capacitor 44 and the load resistor 45 may be chosen for various comparator trip delays if desired.

The embodiments of FIGS. 2 and 3, like the prior art embodiments of FIG. 1, may be utilized with illustrated inputs 21 and 22 to the operational amplifier 23 reversed, since the system responds to the development of either a DC or AC output signal from amplifier 23, and is not phase or polarity sensitive. Further, though the discussed embodiments illustrate the reference AC square wave bias being combined with analog input $V_1$, the square wave bias may obviously be combined with $V_2$ rather than $V_1$.

Figure 5:
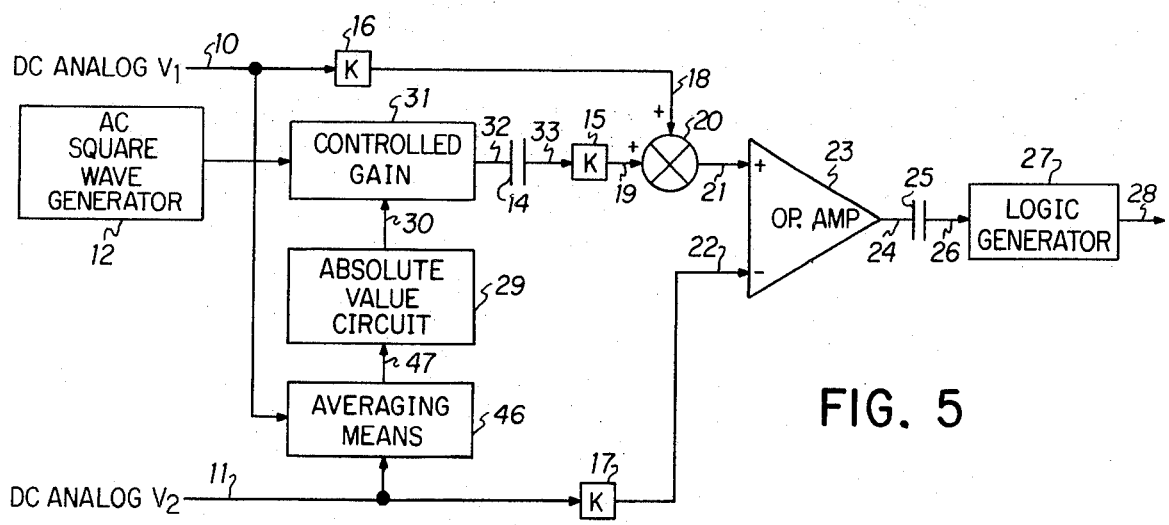
FIG. 5 is a functional diagram of a further embodiment of an improved comparator in accordance with the present invention.

The embodiment of FIG. 2 is modified in FIG. 5 by inclusion of means for varying the amplitude of the AC square wave reference signal as a function of the average of the DC analog input signals 10 and 11 rather than one or the other of these signals. In FIG. 5, analog input signals 10 and 11 are applied as respective inputs to an averaging means 46 the output 47 of which is applied to an absolute value circuit 29 to provide a gain controlling input 30 to the controlled gain means 31. The amplitude of the AC square wave reference is then controlled as a function of the average of the analog input signals. In all other operational aspects the circuitry of FIG. 5 is like that of FIG. 2.

Figure 6:
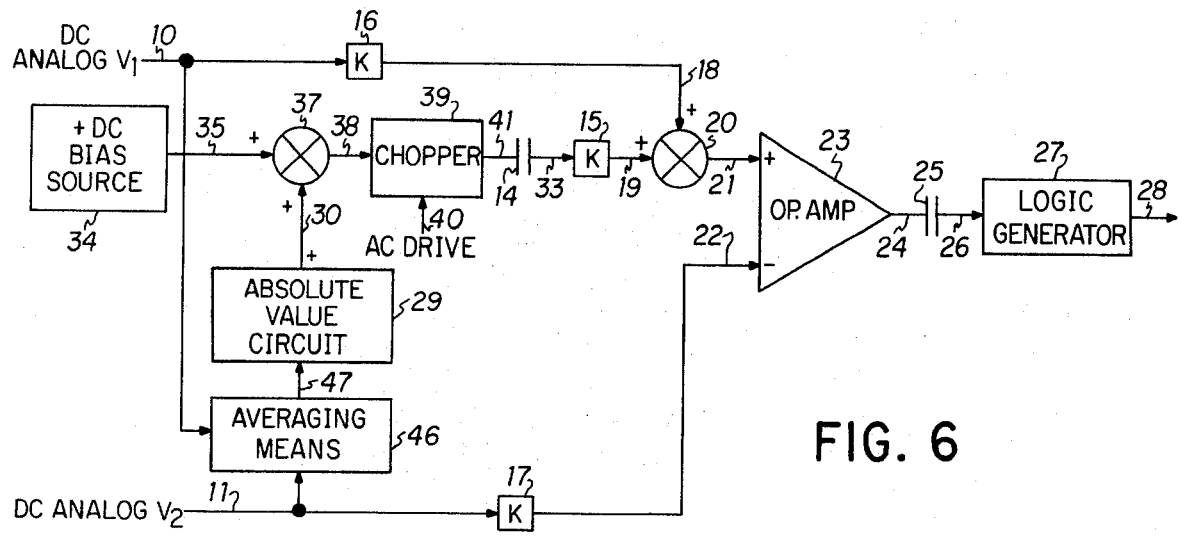
FIG. 6 is a functional diagram of a still further embodiment of an improved comparator in accordance with the present invention.

The embodiment of FIG. 3 may likewise be modified as in FIG. 6 so as to increase the amplitude of the AC reference square wave as a direct function of the average of the amplitudes of the analog inputs signals being compared. Analog input signals 10 and 11 are applied to an averaging means 46 the output 47 of which is applied to an absolute value circuit 29 to produce a positive output 30 to be added in combining means 37 with positive DC bias source 34 such that the square wave reference signal developed at the output 41 of chopper 39 has an amplitude which increases in direct proportion to the average of the DC analog input signals 10 and 11.

Figure 7:
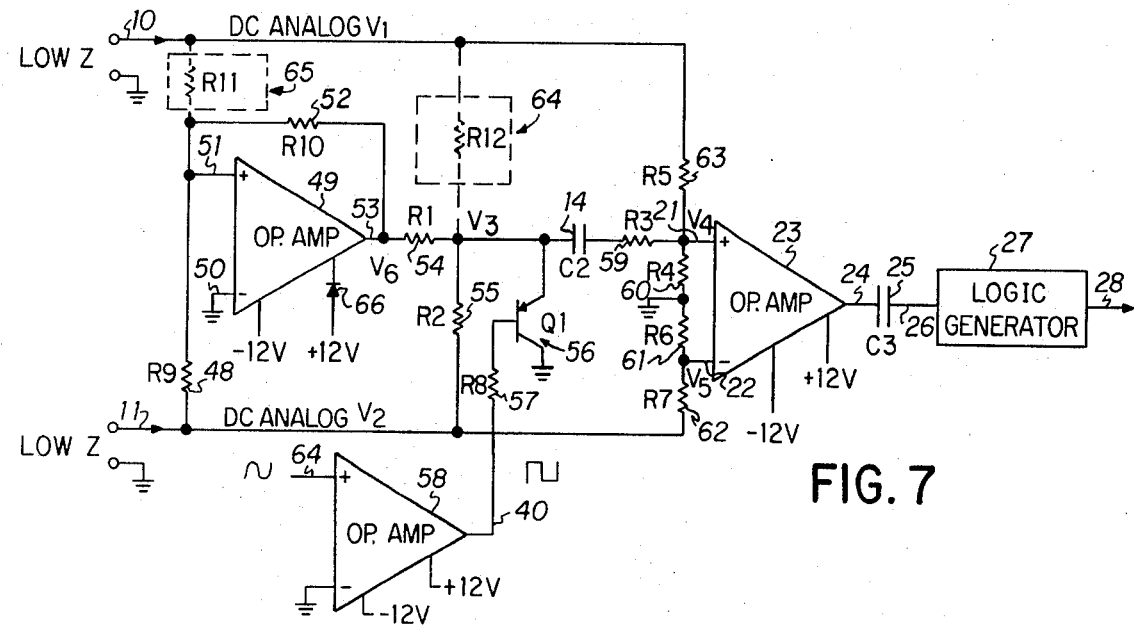
FIG. 7 is a schematic functional diagram of a preferred embodiment of a signal comparator in accordance with the present invention.

A preferred embodiment of the present invention is depicted in FIG. 7 wherein a further operational amplifier is employed in developing a DC bias source voltage with polarity like that of existing polarity of the analog signal which controls the amplitude of the reference square wave bias signal.

The further operational amplifier 49 provides the combined functions of the reference DC bias source and absolute value circuits in the embodiments of FIGS. 3 and 6. DC analog input $V_2$ is applied through a resistor 48 to the noninverting input terminal 51 of operational amplifier 49. The inverting input 50 of operational amplifier 49 is grounded. The polarity of the output signal 53 from operational amplifier 49 is set by the polarity of DC analog input signal 11. Operational amplifier 49 is provided with a small amount of positive feedback to provide hysteresis on the output 53 when DC analog input 11 is near zero volts. The positive feedback is provided by resistor 52 from the output 53 of operational amplifier 49 to the input 51. Feedback resistor 52 should be approximately 100 times larger than the value of resistor 48 through which analog input signal 11 is applied so that the voltage level of analog input 11 required to toggle the saturation output voltage 53 from the operational amplifier 49 from one polarity to the other would be approximately 0.01 times the magnitude of the output 53 from the operational amplifier. The output 53 from operational amplifier 49, designated $V_6$, is accordingly a predetermined saturation voltage level with polarity determined by that of the DC analog input 11, thus permitting direct addition of the DC analog input signal 11 in the ensuing development of a DC reference voltage $V_3$ the magnitude of which is a function of the polarity of a fixed reference DC from operational amplifier 49 as increased by a predetermined proportion of analog input signal $V_2$. Voltage $V_3$ at the junction of resistors 54 and 55 is then chopped by a chopper comprised of transistor 56 and resistor 57, being driven by a square wave drive signal 40. Drive signal 40 might be developed from a low output impedance operational amplifier source 58 in response to a sine wave input 64.

As in the above described embodiments, the chopped signal comprises a reference square wave bias which is applied through coupling capacitor 14 to remove the DC component and provide a symmetrical AC square wave bias for application to the output operational amplifier 23. The magnitude of the square wave bias signal is a function of the fixed DC reference level developed by operational amplifier 49 and the level of DC analog input signal 11.

The comparison of the two analog input signals 10 and 11 is made through resistor dividers $R_4 - R_5$ and $R_6 - R_7$. As in the previously described embodiments, the output operational amplifier 23 toggles under control of the square wave reference bias applied thereto when the amplitudes of input analog signals $V_1$ and $V_2$ differ by an amount less than the peak value of the square wave reference bias signal applied. When the difference in amplitudes between input signals $V_1$ and $V_2$ exceeds the peak amplitude of the square wave reference bias signal, the operational amplifier 23 saturates in one polarity or the other.

As in the previously described embodiments, the inputs to the operational amplifier 23 may be reversed with like results since the output of logic is responsive to an AC square wave output from the operational amplifier to develop a first logic level and a saturated DC output to provide a second logic level. Thus the polarity or phase of the output 24 from operational amplifier 23 is immaterial as concerns the utilization of this output for logic generation. Further, the input DC analog signals $V_1$ and $V_2$ may be reversed with the threshold sensitivity of the comparator programmed as a function of the level of input $V_1$ rather than that of $V_2$.

The trip level program of the embodiment of FIG. 7 may also be in accordance with the function of the average of the input analog signals $V_1$ and $V_2$. Programming as a function of this average may be accomplished by adding resistors $R_{11}$ and $R_{12}$ (shown in phantom in FIG. 7) with each resistor value $R_9$ and $R_{11}$, $R_2$ and $R_{12}$ being equal to twice that of the original value of $R_9$ and $R_2$, thus maintaining the same comparator threshold sensitivity with the trip level being programmed on the basis of an average of the input analog DC signals.

A comparator of the type depicted in FIG. 7 was constructed utilizing Type 1558 operational amplifiers. Operational amplifier 49, operating from +12 and −12 volt supplies would provide an output 53 of −10.5 volts DC with negative analog inputs $V_2$ and an output of +11.0 volts DC with positive analog inputs $V_2$. The addition of diode 66 in the +12 volt supply line reduces the positive saturation level to +10.5 volts and its inclusion would be optional, depending upon the degree of symmetrical accuracy desired for a particular application. Further design criteria centered about the chopper transistor 56 and its driving source. From an optimum standpoint, the transistor should be a very fast saturating type and provide minimal impedance; i.e., chop to as nearly ground potential as possible. Further, the transistor should have a high reverse base-to-emitter breakdown voltage; i.e., in excess of the peak value of the driving square wave. A type 3910 transistor driven by a type 1558 operational amplifier provided these desired operating characteristics.

Given a design criteria of establishing a trip level range from 0.403 volts to 1.478 volts for analog inputs of 0 volts to 8.06 volts, respectively, network analysis techniques were utilized, using selected values of $R_4$, $R_5$, $R_6$, $R_7$, $R_3$ to arrive at appropriate values of $R_1$ and $R_2$ to establish a linear increase of trip level threshold from 0.403 volts to 1.478 volts for input analog DC $V_2$ values from 0 volts to 8.06 volts.

Any failure causing a loss of the 400 Hz chopper drive signal will cause the comparator output to go to a failed condition. Any failure in the programmable trip level circuitry will cause the comparator trip level to be the same as normal or become less than normal. Thus such a failure will not hender the performance of the comparator.

Although the present invention has been described with respect to particular embodiments thereof, it is not to be so limited as changes might be made therein which fall within the scope of the invention as defined in the appended claims.

I claim:

1. A signal comparator having a trip threshold programmed as a direct function of the amplitude of first and second DC analog input signals being compared, comprising a saturable differential amplifier having first and second inputs, means applying signals representing like proportions of said first and second analog input signals as respective inputs to said differential amplifier inputs; bias signal development means producing an AC square wave bias signal and comprising means controlling the amplitude of said square wave bias signal in direct proportion to the level of at least one of said analog input signals; means applying said square wave bias signal to one of said differential amplifier inputs, logic level generation means, means for capacitively coupling the output of said differential amplifier to said logic level generation means, said logic level generation means being responsive to a square wave output from said differential amplifier to derive a first voltage logic level and being responsive to a steady state saturation level output from said differential amplifier to develop a second logic level, said first and second logic levels being developed in response to the difference between the levels of said first and second analog input signals respectively exceeding and being less than the peak value of said AC square wave bias signal.

2. Means as defined in claim 1 wherein said bias signal development means comprises a source of alternating current square wave signal, a controlled gain signal translating means, and means for controlling the gain of said signal translating means in direct proportion to the absolute value of at least one of said analaog input signals.

3. A signal comparator as defined in claim 1 wherein said bias signal development means comprises a direct current voltage bias source of predetermined level and polarity, means for developing a signal proportional to the absolute value of at least one of said DC analog input signals and having a polarity like that of said direct current voltage bias source, signal combining means receiving said bias source and absolute value signals, signal chopping means receiving the output of said signal combining means, capacitive coupling means receiving the output of said signal chopping means, and the output of said capacitive coupling means comprising said AC square wave bias signal as applied to said saturable differential amplifier.

4. A signal comparator as defined in claim 1 wherein said bias signal development means comprises an AC square wave generator, signal averaging means receiving said first and second DC analog input signals and producing an output signal proportional to the average level of the inputs thereto, means for developing a signal proportional to the absolute value of the output of said means for averaging, a controlled gain means, the output of said AC square wave generator being applied to said controlled gain means, means for controlling the gain of said controlled gain means in accordance with the output of said absolute value circuit, and the output of said controlled gain means comprising said AC square wave bias signal as applied to said saturable differential amplifier.

5. Signal comparator means as defined in claim 1 wherein said bias signal development means comprises a source of DC bias of predetermined level and polarity, signal averaging means receiving said first and second analog input signal to produce an output signal corresponding to the average of the input signals thereto, means for developing a signal proportional to the absolute value of the output of said means for averaging, the output of said absolute value developing means having a polarity like that of said DC bias source, means for combining the output of said DC bias source and said absolute value determining means, signal chopping means receiving the output of said means for combining, and capacitive coupling means through which the output of said signal chopping means is applied as input to said saturable differential amplifier.

6. A signal comparator as defined in claim 1 wherein said saturable differential amplifier comprises an operational amplifier having inverting and noninverting input terminals, means for applying like proportions of said first and second DC analog input signals as respective inputs to said operational amplifier input terminals, said bias signal development means comprising a further operational amplifier, means for applying a signal proportional to at least one of said DC analog input signals to the noninverting input of said further operational amplifier, means for grounding the inverting input terminal of said further operational amplifier, positive signal feedback means connected between the output of said further operational amplifier and the noninverting input terminal thereof, whereby the output from said further differential amplifier comprises a DC saturational level signal of polarity like that of the signal applied to the noninverting verting input terminal thereof, means for combining predetermined portions of the output of said further operational amplifier and at least one of said DC analog input signals, signal chopping means receiving said last defined combined signal and chopping the input thereto at a predetermined rate in response to a square wave drive signal source, and capacitively coupling means through which the output of said signal chopping means is applied as a further input to one of said operational amplifier input terminals.

7. A comparator as defined in claim 6 comprising means for applying like proportions of each of said first and second analog input signals as inputs to the noninverting input terminal of said further differential amplifier, and means for combining like proportions of each of said first and second analog input signals with the output of said further differential amplifier for application to said signal chopping means, whereby the amplitude of said square wave bias signal is directly proportional to the average of the respective levels of said first and second DC analog input signals.

* * * * *